United States Patent
Sartor et al.

(10) Patent No.: US 7,336,848 B2
(45) Date of Patent: Feb. 26, 2008

(54) METHOD AND APPARATUS FOR IMPROVING PICTURE SHARPNESS

(75) Inventors: Piergiorgio Sartor, Fellbach (DE); Frank Moesle, Stuttgart (DE); Peter Wagner, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 757 days.

(21) Appl. No.: 10/371,711

(22) Filed: Feb. 21, 2003

(65) Prior Publication Data
US 2003/0219169 A1 Nov. 27, 2003

(30) Foreign Application Priority Data
Feb. 22, 2002 (EP) .................................. 02004007

(51) Int. Cl.
*G06K 9/40* (2006.01)
(52) U.S. Cl. ..................... 382/274; 382/263; 382/266
(58) Field of Classification Search ........ 382/260–266, 382/270, 274, 275
See application file for complete search history.

(56) References Cited

U.S. PATENT DOCUMENTS

| | | | |
|---|---|---|---|
| 5,428,398 A | 6/1995 | Faroudja | |
| 6,055,340 A * | 4/2000 | Nagao | 382/261 |
| 6,094,205 A | 7/2000 | Jaspers | |
| 6,571,019 B1 * | 5/2003 | Kim et al. | 382/246 |

FOREIGN PATENT DOCUMENTS

EP 0 164 203 12/1985

OTHER PUBLICATIONS

Patent Abstracts of Japan, vol. 1997, No. 06, Jun. 30, 1997, JP 09 037112.

* cited by examiner

*Primary Examiner*—Matthew C. Bella
*Assistant Examiner*—Wes Tucker
(74) *Attorney, Agent, or Firm*—Oblon, Spivak, McClelland, Maier & Neustadt, P.C.

(57) ABSTRACT

A method for improving the sharpness of pictures contained in a video signal comprises the steps of: a) processing said pictures on the basis of a step/edge enhancement algorithm to obtain step/edge enhanced pictures, b) processing said pictures on the basis of a texture enhancement algorithm to obtain texture enhanced pictures, and mixing said step/edge enhanced pictures with said texture enhanced pictures to obtain a video signal containing sharpness-improved pictures, wherein steps a) and b) are performed in dependence of motion information being related to said pictures.

8 Claims, 4 Drawing Sheets

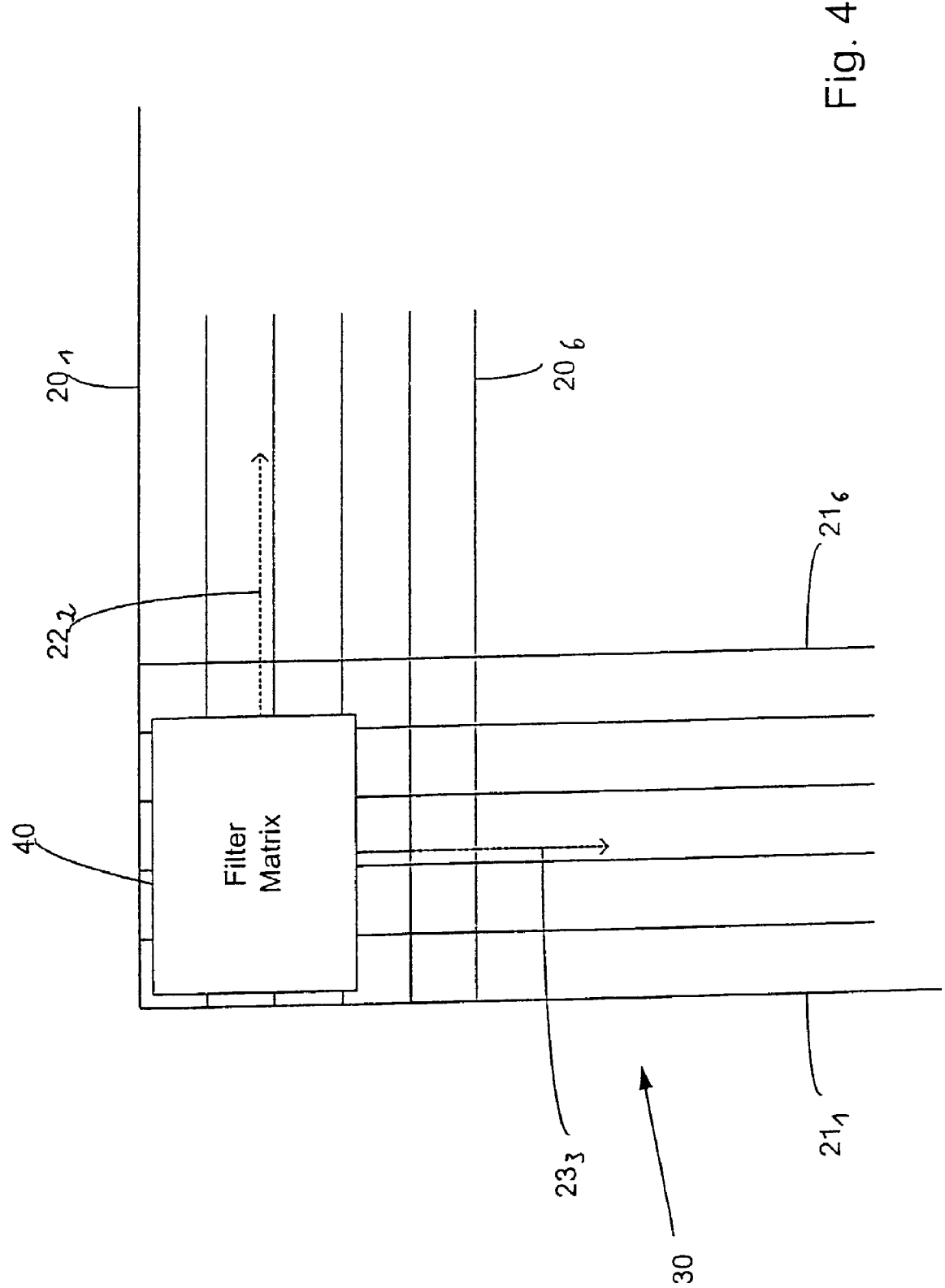

METHOD AND APPARATUS FOR IMPROVING PICTURE SHARPNESS

The invention relates to a method and an apparatus for improving the sharpness of pictures contained in a video signal.

In recent years it has become common to implement image processing algorithms into display devices like TV screens. Since computational resources steadily increase, it is even possible to run very complex image processing algorithms. The use of such image processing algorithms yields to a sharp improvement in picture quality.

An important sector concerning image processing is sharpness/clearness enhancement. Many efforts have been done in this sector in order to improve in particular the quality of video signals (TV signals). As the way to improve sharpness/clearness might be different for video signals containing motion and video signals which do not contain motion, algorithms have been developed which adapt their behaviour to varying motion within these signals. For example. EP 0 164 203 A2 discloses a method for vertical detail enhancement which takes into account motion within the video signal. When no motion occurs in the picture scene, vertical detail is added and subtracted from the luminance representative signal to form first and second enhanced luminance signals, respectively.

It is an object of the present invention to provide a method and an apparatus being capable to further improve picture sharpness while at the same time showing a high flexibility.

To solve this object, the present invention provides a method for improving the sharpness of pictures according to claim 2. Further, the present invention provides an apparatus for executing said method according to claim 3. Last, a computer program product according to claim 8 is provided.

According to the present invention, a method for improving the sharpness of pictures contained in a video signal comprises the steps of:
 a) processing said pictures on the basis of a step/edge enhancement algorithm to obtain step/edge enhanced pictures,
 b) processing said pictures on the basis of a texture enhancement algorithm to obtain texture enhanced pictures,
 c) mixing said step/edge enhanced pictures with said texture enhanced pictures to obtain a video signal containing sharpness improved pictures. wherein steps a) and b) are performed in dependence of motion information being related to said pictures.

In other words, a "stream" of pictures (contained within the video signal) to be processed is duplicated into two identical picture streams, wherein one of said duplicated picture streams is processed on the basis of a step/edge enhancement algorithm, and the other picture stream is processed on the basis of a texture enhancement algorithm. These two processing procedures are preferably executed simultaneously. The step/edge enhancement algorithm preferably comprises non-linear calculations which are in particular suitable to enhance special parts/properties of the pictures. The step/edge enhancement algorithm is for example perfectly suited for improving a transition between the roof of a house and the blue sky above. Such a transition can only unsufficiently be improved using a "normal" sharpness enhancement algorithm. Further examples of parts of the picture suitable to be processed with the step/edge enhancement algorithm are borders of windows, eyes in a face, and artificial overlay of graphics (like letters) on a normal picture. Generally, it can be said that this algorithm tries to avoid a phenomenon known as "overshoot" which happens on edges in case of standard high frequency amplification. The basic principle is to assume there is overshoot and to cut it properly, using a non-linear operation like a limiter.

Accordingly, the texture enhancement algorithm preferably executes high pass filter calculations and/or second derivative calculations suitable to enhance the sharpness of the overall picture. Possible realizations are filters for executing one- or two dimensional filter calculations with matrix kernel, one- or two dimensional separable filter calculations operating on rows and columns, or one- or two dimensional separable filter calculations operating on diagonals. Examples of picture structures or picture parts suitable to be processed with the texture enhancement algorithm are grass, water, trees and hairs. A main difference between the step/edge enhancement algorithm and the texture enhancement algorithm is that the texture enhancement algorithm does not cut overshoot, since evident overshoot is missing in the picture areas to be processed by the texture enhancement algorithm due to the not regular structures of said areas. In a preferred embodiment, the step/edge enhancement algorithm and the texture enhancement algorithm are identical except of a non-linear operation to avoid overshoot which is added to the step/edge enhancement process.

The two processed picture streams are preferably mixed in such a way that each picture of one picture stream is mixed with "its" corresponding picture of the other picture stream. The resulting reunified picture stream is a video signal containing pictures which have been improved in sharpness.

The above described combination of two different algorithms allows to obtain very good sharpness results. Since the inventive method further takes into account motion present within said pictures, good sharpness results can be achieved for both pictures with motion and pictures without motion. The combination of two different algorithms and motion detection provides a very effective and flexible method for improving picture sharpness.

In a preferred embodiment, each of the two duplicated picture streams is duplicated another time before executing the corresponding enhancement algorithms. As a result, each enhancement algorithm processes two picture streams:

A step/edge enhancement algorithm according to the present invention preferably performs the following operation: In a first way (first picture stream), only information of the picture currently processed is used to enhance said picture, thereby obtaining first step/edge enhanced pictures. In the second way (second picture stream), information of the picture currently processed as well as information of pictures previously or succeedingly processed is used to enhance said picture, thereby obtaining second step/edge enhanced pictures. Each of the first step/edge enhanced pictures is mixed with its corresponding picture of the second step/edge enhanced pictures according to the motion information. As a result, "final" step/edge enhanced pictures as mentioned in step a) are obtained.

Further, a texture enhancement algorithm according to the present invention preferably performs the following operation: In a first way (third picture stream), only information of the picture currently processed is used to enhance said picture, thereby obtaining first texture enhancement pictures. In a second way (fourth picture stream), information of the picture currently processed as well as information of pictures previously or succeedingly processed is used to enhance said picture, thereby obtaining second texture enhancement pictures. Each of the first texture enhancement pictures is mixed with its corresponding picture of the second texture enhancement pictures according to the motion information. As a result, "final" texture enhanced pictures as mentioned in step b) are obtained.

If there is high motion, more emphasis is given to a first way of processing (also referred to as field enhancement), respectively, whereas in case of low motion the second way (also referred to as frame enhancement) is emphasized more, respectively. Emphasis is given by determining the mixing ratio when mixing said first and second picture streams together, respectively.

The mixing ratio preferably is dynamically adjustable and depends on the motion information which may be directly calculated from said pictures by a motion detection process or may be supplied by a predetermined motion signal being part of the video signal.

Step c) is preferably performed according to step/edge information which may be directly calculated from said pictures by a step/edge detection process and/or may be supplied in form of special step/edge information contained within the video signal. In other words, a mixing ratio of the step/edge enhanced pictures with texture enhanced pictures can be dynamically adjusted in dependence of said step/edge information.

To further improve picture sharpness, each sharpness improved picture obtained in step c) may be further mixed with its corresponding unprocessed original picture in dependence of feature information related to the original picture. The feature information may be directly derived from the pictures by a feature detection process and/or may be supplied in form of special feature information contained within the video signal. By properly setting the mixing ratio, this enables to "switch off" the enhancement algorithms if there is no need for sharpness enhancement (computational power can be saved), and to further improve sharpness quality in some cases.

Depending on computational resources, the motion/step/edge/feature information may be provided in form of maps, respectively. These maps may then be used by the enhancement algorithms and/or the filter processes to perform their tasks. The maps are preferably used as look-up tables containing relationships between areas (down to pixel level) and corresponding values. This enables to operate on a fine granularity (enables to only locally use this information, to process only parts of the pictures) if computational resources are presently low. An example of feature information is picture noise. Feature information refers mainly on noise, but it can be used also in a different way, for example to avoid processing an area containing a menu or other artificially generated graphics, which sometimes is better to left unprocessed.

In a preferred embodiment, a respective amount of enhancement to be performed with the texture and step/edge enhancement algorithms is externally controlled. If, for example, a user wishes to increase/decrease picture sharpness enhancement, he may send a respective signal to the respective enhancement machines using an external controlling means.

The apparatus for improving the sharpness of pictures contained in a video signal according to the present invention comprises:

input means for inputting said pictures, step/edge enhancement means being connected to said input means for enhancing said inputted pictures to obtain step/edge enhanced pictures, texture enhancement means being connected to said input means for enhancing said inputted pictures to obtain texture enhanced pictures, first mixing means being connected to said step/edge enhancement means and said texture enhancement means for mixing said step/edge and texture enhanced pictures to obtain a video signal containing sharpness improved pictures, wherein said step/edge enhancement means and said texture enhancement means are operable in dependence of motion information being related to said pictures.

In a preferred embodiment, the step/edge enhancement means enhances each picture in two different ways: In a first way, only information of the picture currently processed is used to enhance said picture, thereby obtaining first step/edge enhanced pictures. In a second way, information of the picture currently processed as well as information of pictures previously or succeedingly processed is used to enhance said picture, thereby obtaining second step/edge enhanced pictures. In this embodiment, the apparatus further comprises second mixing means being connected to said step/edge enhancement means for mixing each of the first step/edge enhanced pictures with its corresponding picture of said second step/edge enhanced pictures according to the motion information. As a result of said mixing procedure, the step/edge enhanced pictures as mentioned in step a) are obtained.

Accordingly, in said embodiment, the texture enhancement means enhances each picture in two different ways: In a first way, only information of the picture currently processed is used to enhance said picture, thereby obtaining first texture enhancement pictures. In a second way, information of the picture currently processed as well as information of pictures previously or succeedingly processed is used to enhance said picture, thereby obtaining second texture enhancement pictures. In this embodiment, the apparatus further comprises third mixing means being connected to the texture enhancement means for mixing each of the first texture enhancement pictures with its corresponding picture of said second texture enhancement pictures according to said motion information. As a result, said mixing procedure yields the texture enhanced pictures as mentioned in step b).

The apparatus advategeously comprises motion detecting means being connected to the input means and to the second and third mixing means for directly calculating the motion information from said inputted pictures and/or for extracting said motion Information as special motion information contained within the video signal. The second and third mixing means are controllable in dependence of an output of the motion detecting means.

The apparatus may further comprise a step/edge detecting means being connected to said input means and to the first mixing means for directly calculating step/edge information from the inputted pictures and/or for extracting said step/edge information as special step/edge information contained within the video signal. The first mixing means is controllable in dependence of an output of said step/edge detecting means.

The apparatus may further comprise a feature detecting means being connected to the input means and to a fourth mixing means. The fourth mixing means mixes each sharpness improved picture with its corresponding unprocessed original picture in accordance with feature information being generated by the feature detecting means and being related to said original picture. The feature detecting means calculates the feature information directly from said inputted pictures and/or extracts special feature information contained within the video signal.

The apparatus may further comprise an external controlling means allowing to externally control the amount of enhancement to be performed with said texture and step/edge enhancement algorithms.

The apparatus may further comprise a storage means to store step/edge/motion/feature information generated by the above step/edge/motion/feature detecting means.

Last, the invention provides a computer program product comprising computer program means to perform the inventive method or any step thereof when it is executed on a computer, a digital signal processing means, and the like.

In the following description further features and advantages of the present invention are explained while making reference to the accompanying drawings, wherein:

FIG. 4 shows a schematic drawing of a third example illustrating how the texture enhancement algorithm operates.

Figure 1:
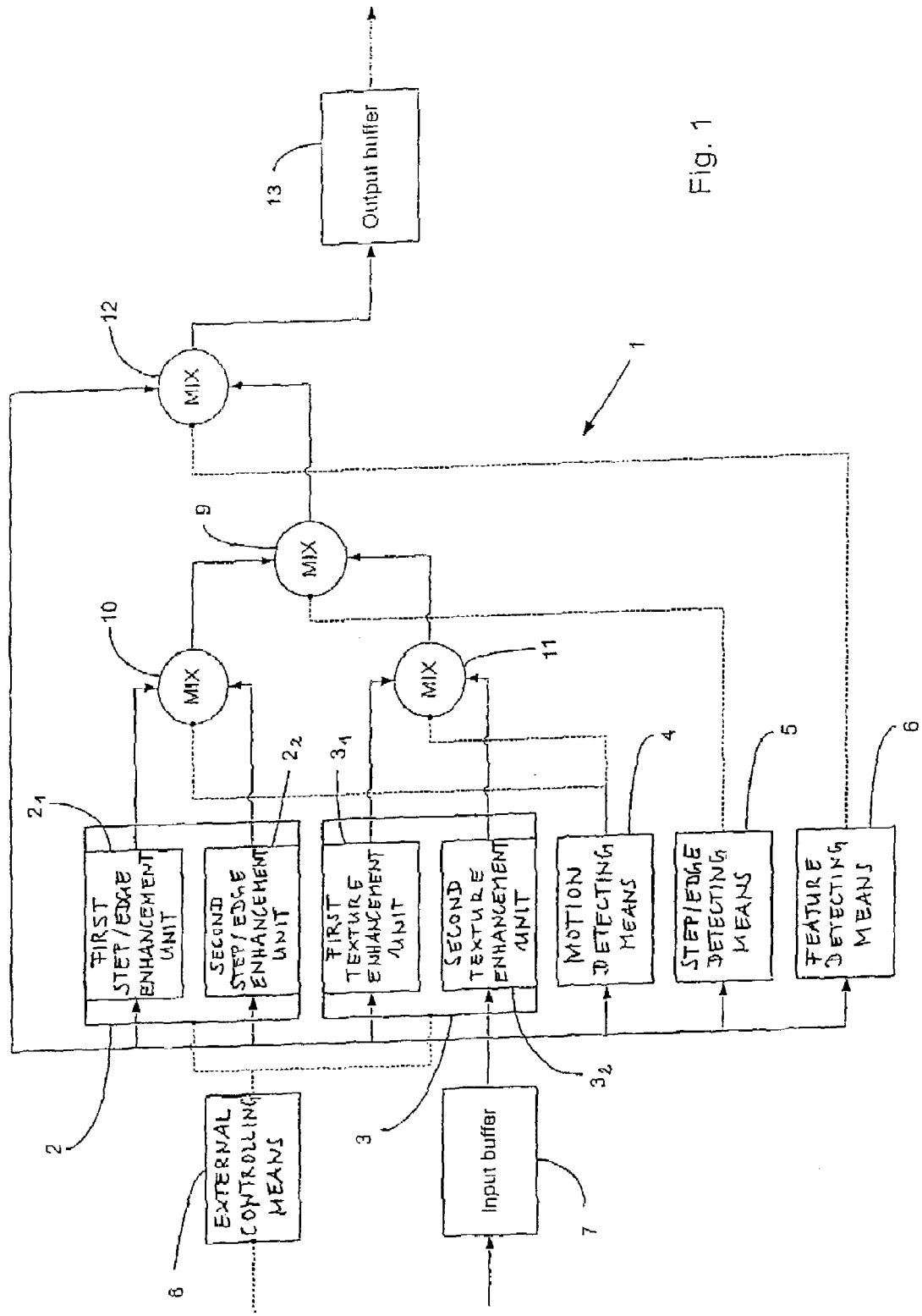
FIG. 1 shows a preferred embodiment of an apparatus according to the present invention.

In the following description, making reference to FIG. 1, a preferred embodiment of an apparatus according to the present invention will be described.

An apparatus 1 comprises a step/edge enhancement means 2, a texture enhancement means 3, a motion detecting means 4, a step/edge detecting means 5, a feature detecting means 6, an input buffer 7, an external controlling means 8, a first mixing means 9, second mixing means 10, a third mixing means 11, a fourth mixing means 12 and an output buffer 13. The step/edge enhancement means 2 comprises a first step/edge enhancement unit $2_1$ and a second step/edge enhancement unit $2_2$. The texture enhancement means 3 comprises a first texture enhancement unit $3_1$ and a second texture enhancement unit $3_2$.

In the following description it will be explained how the apparatus 1 performs picture sharpness improvement.

First, a video signal containing a plurality of pictures is supplied to the input buffer 7 where it may be stored for a predetermined period of time. Then, the pictures are supplied to the first and second step/edge enhancement units $2_1$, $2_2$, to the first and second texture enhancement units $3_1$, $3_2$, to the motion detecting means 4, to the step/edge detecting means 5, to the feature detecting means 6, and to the fourth mixing means 12. The motion detecting means 4 processes the pictures in order to detect if motion is present. If motion is present, the motion detecting means 4 sends a respective output signal representing the amount of motion detected to both the second mixing means 10 and the third mixing means 11. It is possible to either send a single numerical value representing the motion or to send a complete motion map to second and third mixing means 10, 11, respectively. The pictures are processed by the first and second step/edge enhancement units $2_1$, $2_2$, and by the first and second texture enhancement units $3_1$, $3_3$.

The first step/edge enhancement unit $2_1$ and the first texture enhancement unit $3_1$ use at least two consecutive pictures (two consecutive video fields which constitute a frame, respectively) in order to perform their enhancing tasks. Therefore, these units yield good sharpness results if no motion is present. The second step/edge enhancement unit $2_2$ and the second texture enhancement unit $3_2$ only use one single video field for performing a respective enhancement task. These units yield good sharpness results if motion is present. The first step/edge enhancement unit $2_1$ outputs first step/edge enhanced pictures, and the second step/edge enhancement unit $2_2$ outputs second step/edge enhanced pictures. These picture streams are reunified by the second mixing means 10 to obtain a single picture stream of step/edge enhanced pictures.

Accordingly, the first texture enhancement unit $3_1$ outputs first texture enhancement pictures, and the second texture enhancement unit $3_2$ outputs second texture enhancement pictures. These picture streams are reunified by the third mixing means 11 in order to obtain a single picture stream of texture enhanced pictures. The single picture stream of step/edge enhanced pictures and the single picture stream of texture enhanced pictures are reunified by the first mixing means 9 in order to obtain a video signal containing sharpness improved pictures. The mixing procedure of the first mixing means 9 is performed in dependence of an output of the step/edge detecting means 5, which may be a numerical value or a complete map of step/edge data.

In the fourth mixing means 12 the "original" picture stream is mixed with the single picture stream of sharpness improved pictures outputted by the first mixing means 9 in order to obtain a final sharpness-improved video signal. This final signal is supplied to an output buffer 13 and may be used for further processing.

The fourth mixing means 12 is operated in dependence of an output signal of the feature detecting means 6 which may be a signal representing noise within the respective picture. If the feature detecting means 6 detects that no noise is present within the picture, there may be no need for improving sharpness of the picture. In this case, the respective output signal of the feature detecting means 6 is set in a way that the fourth mixing means 12 blocks the output of the first mixing means 9, leading to the result that the output of the fourth mixing means 12 is identical to the picture outputted by the input buffer 7. This feature ensures a high flexibility of the apparatus (auto power off functionality for the case no sharpness improvement is necessary).

Advantages of the apparatus 1 described above are an optimum sharpness result with minimum realization effort. Besides this, a high flexibility and scalability can be achieved. Further, the apparatus can be easily realized both in software and hardware or in a combination of both.

In the following, making reference to FIGS. 2 to 4, three possible ways of operating the texture enhancement means 3 will be given. In all Figures the bold lines $20_1$ to $20_n$, $21_1$ to $21_n$ represent pixel borders, whereas the dotted arrows and $22_1$ to $22_n$, $23_1$ to $23_n$, $24_1$ to $24_n$ and $25_1$ to $25_n$ represent the working directions of the respective filter mechanisms.

Figure 2:
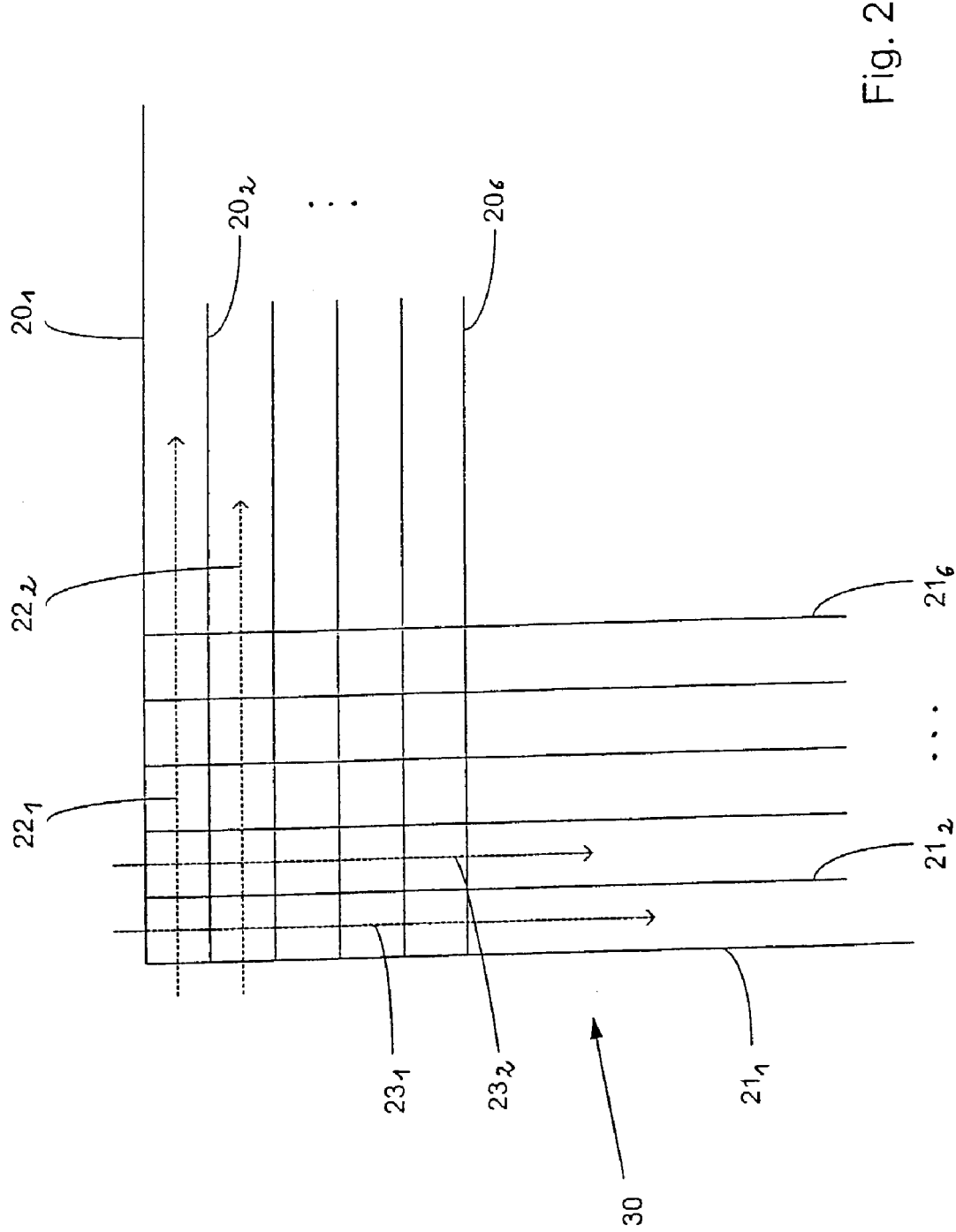
FIG. 2 shows a schematic drawing of a first example illustrating how a texture enhancing algorithm operates.

As can be taken from FIG. 2, the working directions of the filter mechanism are parallel to either the horizontal axis (working directions indicated by the reference numerals $22_1$, $22_2$) or the vertical axis (working directions indicated by the reference numerals $23_1$, $23_2$) of the pixel field 30.

Figure 3:
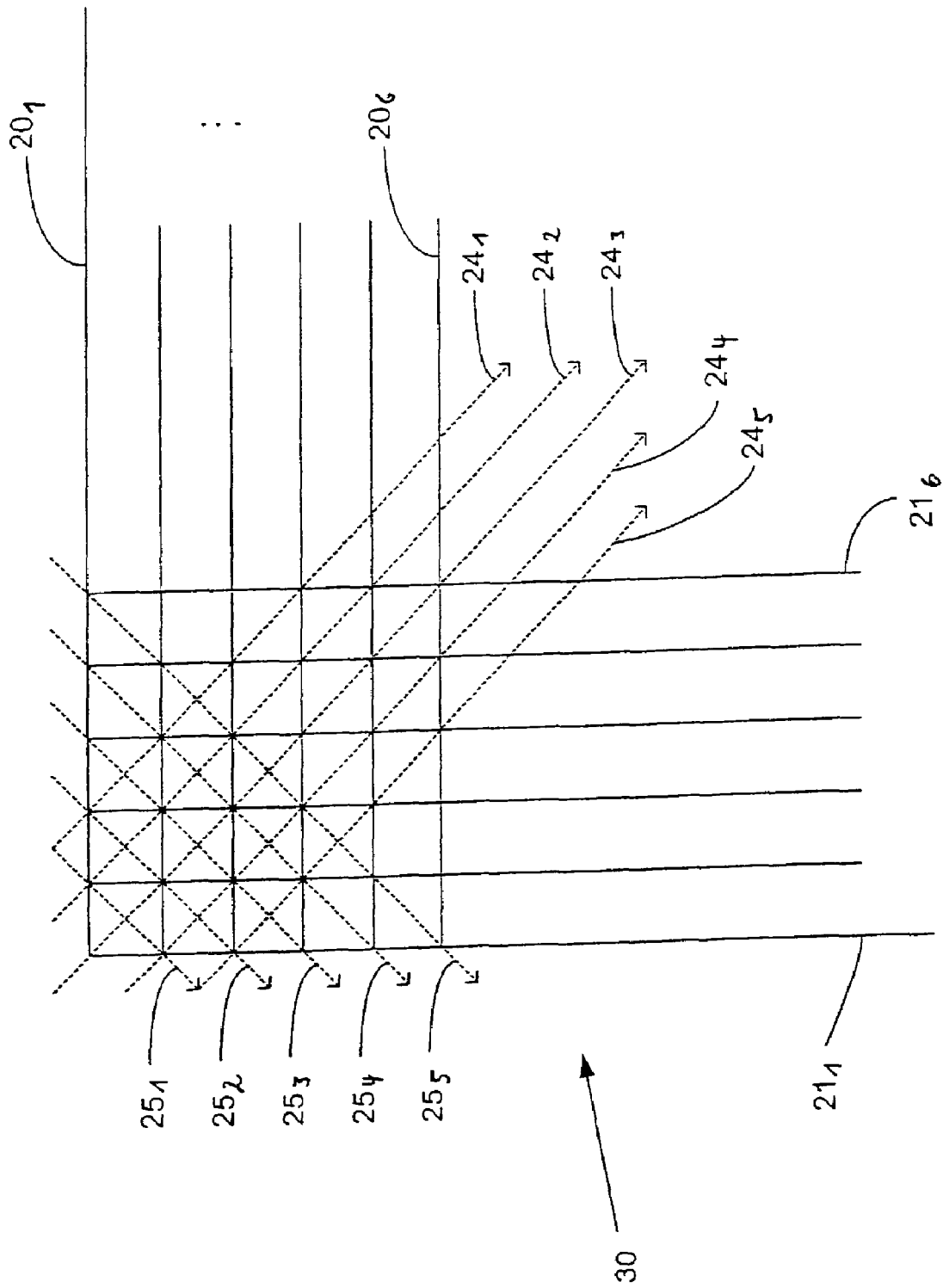
FIG. 3 shows a schematic drawing of a second example illustrating how the texture enhancement algorithm operates.

In contrast, the working directions in FIG. 3 are shifted by 45° (working directions indicated by the reference numerals $24_1$ to $24_5$) and −45° (working directions indicated by the reference numerals $25_1$ to $25_5$), with respect to the vertical axis of the pixel field 30, respectively.

As can be taken from FIG. 4, the working directions of a filter matrix 40 is either parallel to the horizontal axis or the vertical axis (working directions indicated by the reference numerals $22_2$ to $23_3$) of the pixel field 30. This is the standard way to implement a generic 2D filter, using a matrix kernel and convolving it with the matrix picture. The drawback is the computational load, which sometimes is too high to be able to afford this full solution.

As has become apparent in the foregoing description, the present invention preferably operates as follows:

Two or more pictures from an incoming TV signals are taken; moving and non-moving areas are detected and a corresponding map is created (alternatively an already available motion map can be used). On the processed target picture particular properties, like edges, noise, high/low frequencies and so on are detected, creating one or more corresponding maps. A 2D high pass filtering or second derivative calculation or similar is performed. At least the following ways are known: a full 2D filter with matrix kernel (FIG. 4), a separable filter operating on rows and columns (FIG. 2) or a separable filter operating on diagonals (FIG. 3). The last kind of filter applies very well in case of one second derivative, having good enhancing properties (still better than row and columns), low noise profile (still better than row and columns) and reasonable computational load. This filtering is done on field and frame basis, then, accordingly on the motion map calculated, the two results are weighted and merged. This allows to have best quality in case of static areas (frame operation) or avoiding artifacts, while keeping still good quality in case of moving areas (field operation). The operation can be done in two steps or mixed into a single step, depending on the most suitable solution and on the kind of merging used. With the same policy a 2D step improvement algorithm is applied to the target picture. This is a specific, usually non-linear, processing used to enhance special picture parts like edges or similar. Then the properties measured are used to weight and merge the result of the first filter with the result of the second one. Of course, the amount of filtering can also be weighted in relation with the original picture, taking into account other measured properties like noise. The processed picture is sent to the output buffer. An external control is also available in order to be able to fine tune the overall process.

The invention claimed is:

1. A method for improving the sharpness of pictures contained in a video signal, comprising the steps of:
   (a) processing said pictures on the basis of a step/edge enhancement algorithm to obtain step/edge enhanced pictures,
   (b) processing said pictures on the basis of a texture enhancement algorithm to obtain texture enhanced pictures,
   (c) mixing said step/edge enhanced pictures with said texture enhanced pictures to obtain a video signal containing sharpness improved pictures, wherein steps (a) and (b) are performed in dependence of motion information being related to said pictures,
   wherein said step/edge enhancement algorithm enhances each picture in two different ways, wherein
   in a first way, only information of the picture currently processed is used to enhance said picture, thereby obtaining first step/edge enhanced pictures, and
   in a second way, information of the picture currently processed as well as information of pictures previously or succeedingly processed is used to enhance said picture, thereby obtaining second step/edge enhanced pictures,
   wherein each of said first step/edge enhanced pictures is mixed with its corresponding picture of said second step/edge enhanced pictures according to said motion information, thereby obtaining said step/edge enhanced pictures.

2. A method for improving the sharpness of pictures contained in a video signal, comprising the steps of:
   (a) processing said pictures on the basis of a step/edge enhancement algorithm to obtain step/edge enhanced pictures,
   (b) processing said pictures on the basis of a texture enhancement algorithm to obtain texture enhanced pictures,
   (c) mixing said step/edge enhanced pictures with said texture enhanced pictures to obtain a video signal containing sharpness improved pictures, wherein steps (a) and (b) are performed in dependence of motion information being related to said pictures,
   wherein said texture enhancement algorithm enhances each picture in two different ways, wherein
   in a first way, only information of the picture currently processed is used to enhance said picture, thereby obtaining first texture enhancement pictures, and
   in a second way, information of the picture currently processed as well as information of pictures previously or succeedingly processed is used to enhance said picture, thereby obtaining second texture enhancement pictures,
   wherein each of said first texture enhancement pictures is mixed with its corresponding picture of said second texture enhancement pictures according to said motion information, thereby obtaining said texture enhanced pictures.

3. An apparatus for improving the sharpness of pictures contained in a video signal, comprising:
   input means for inputting said pictures,
   step/edge enhancement means being connected to said input means for enhancing said inputted pictures to obtain step/edge enhanced pictures,
   texture enhancement means being connected to said input means for enhancing said inputted pictures to obtain texture enhanced pictures,
   first mixing means being connected to said step/edge enhancement means and said texture enhancement means for mixing said step/edge and texture enhanced pictures to obtain a video signal containing sharpness improved pictures,
   wherein said step/edge enhancement means and said texture enhancement means are operable in dependence of motion information being related to said pictures,
   wherein said step/edge enhancement means enhances each picture in two different ways, wherein
   in a first way, only information of the picture currently processed is used to enhance said picture, thereby obtaining first step/edge enhanced pictures, and
   in a second way, information of the picture currently processed as well as information of pictures previously or succeedingly processed is used to enhance said picture, thereby obtaining second step/edge enhanced pictures,
   wherein said apparatus further comprises second mixing means being connected to said step/edge enhancement means for mixing each of the first step/edge enhanced pictures with its corresponding picture of said second step/edge enhanced pictures according to said motion information, thereby obtaining said step/edge enhanced pictures.

4. The apparatus according to claim 3, wherein said texture enhancement means enhances each picture in two different ways, wherein in a first way, only information of the picture currently processed is used to enhance said picture, thereby obtaining first texture enhancement pictures, and in a second way, information of the picture currently processed as well as information of pictures previously or succeedingly processed is used to enhance said picture, thereby obtaining second texture enhancement pictures, wherein said apparatus further comprises third mixing means being connected to said texture enhancement means for mixing each of the first texture enhancement pictures with its corresponding picture of said second texture enhancement pictures according to said motion information, thereby obtaining said texture enhanced pictures.

5. The apparatus according to claim 4, further comprising:

motion detecting means being connected to said input means and to the second and third mixing means for directly calculating said motion information from said inputted pictures and/or for extracting said motion information as special motion information contained within the video signal, wherein said second and third mixing means are controllable in dependence of an output of said motion detecting means.

6. The apparatus according to claim 4, further comprising:

a feature detecting means being connected to said input means and to a fourth mixing means, said fourth mixing means mixing each sharpness improved picture with its corresponding unprocessed original picture in accordance with feature information being generated by said feature detecting means and being related to said original picture, wherein said feature detecting means calculates said feature information directly from said inputted pictures and/or extracts special feature information contained within said video signal.

7. An apparatus for improving the sharpness of pictures contained in a video signal, comprising:

input means for inputting said pictures, step/edge enhancement means being connected to said input means for enhancing said inputted pictures to obtain step/edge enhanced pictures, texture enhancement means being connected to said input means for enhancing said inputted pictures to obtain texture enhanced pictures, first mixing means being connected to said step/edge enhancement means and said texture enhancement means for mixing said step/edge and texture enhanced pictures to obtain a video signal containing sharpness improved pictures, wherein said step/edge enhancement means and said texture enhancement means are operable in dependence of motion information being related to said pictures, wherein said texture enhancement means enhances each picture in two different ways, wherein in a first way, only information of the picture currently processed is used to enhance said picture, thereby obtaining first texture enhancement pictures, and in a second way, information of the picture currently processed as well as information of pictures previously or succeedingly processed is used to enhance said picture, thereby obtaining second texture enhancement pictures, wherein said apparatus further comprises third mixing means being connected to said texture enhancement means for mixing each of the first texture enhancement pictures with its corresponding picture of said second texture enhancement pictures according to said motion information, thereby obtaining said texture enhanced pictures.

8. A computer readable recording medium including computer program instructions which cause a processor to execute a method for improving the sharpness of pictures contained in a video signal, comprising:

(a) processing said pictures on the basis of a step/edge enhancement algorithm to obtain step/edge enhanced pictures, (b) processing said pictures on the basis of a texture enhancement algorithm to obtain texture enhanced pictures, (c) mixing said step/edge enhanced pictures with said texture enhanced pictures to obtain a video signal containing sharpness improved pictures, wherein steps (a) and (b) are performed in dependence of motion information being related to said pictures, wherein said step/edge enhancement algorithm enhances each picture in two different ways, wherein in a first way, only information of the picture currently processed is used to enhance said picture, thereby obtaining first step/edge enhanced pictures, and in a second way, information of the picture currently processed as well as information of pictures previously or succeedingly processed is used to enhance said picture, thereby obtaining second step/edge enhanced pictures, wherein each of said first step/edge enhanced pictures is mixed with its corresponding picture of said second step/edge enhanced pictures according to said motion information, thereby obtaining said step/edge enhanced pictures.

* * * * *